Jan. 13, 1970   C. O. LARSON   3,489,443
TURNBUCKLE
Filed Sept. 24, 1968
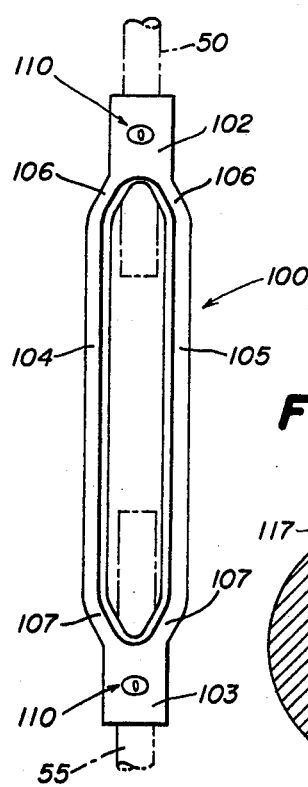
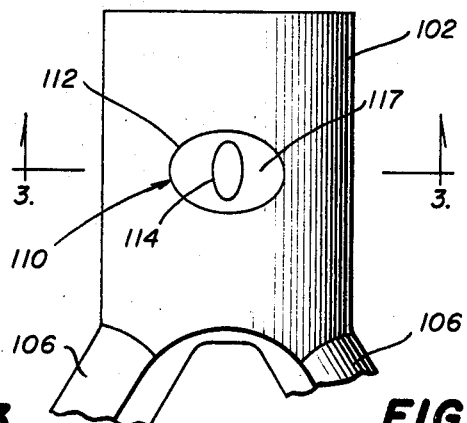
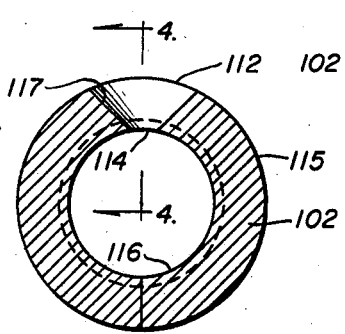
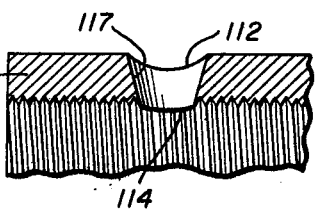
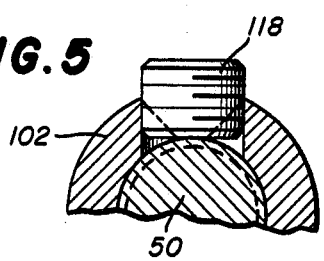
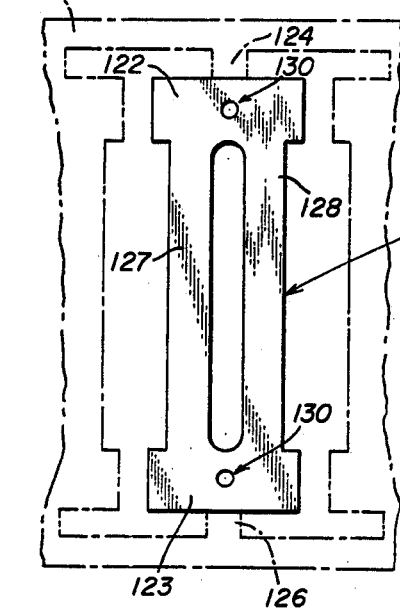
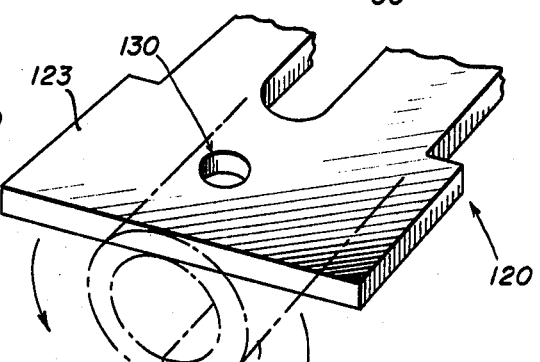
INVENTOR
CHARLES O. LARSON
BY
Prangley, Baird, Clayton,
Miller & Vogel
ATTYS.

United States Patent Office 3,489,443
Patented Jan. 13, 1970

3,489,443
TURNBUCKLE
Charles O. Larson, Sterling, Ill., assignor to Chas. O. Larson, Sterling, Ill., a corporation of Illinois
Filed Sept. 24, 1968, Ser. No. 762,109
Int. Cl. E16b 7/06; E21d 15/14
U.S. Cl. 287—60    3 Claims

ABSTRACT OF THE DISCLOSURE

A turnbuckle is disclosed having in the wall of each cylindrical threaded end portion thereof an opening describing elliptical curves along the inner and outer surfaces of each wall. The centers of the curves lie along a line extending radially through the axis of the cylindrical end portion and the major axis of the inner curve is parallel to the minor axis of the outer curve. In making the turnbuckle, a blank is stamped from a strip of sheet metal, the blank having a circular hole through each end thereof in that portion which will form the threaded end, the diameter of the hole being slightly greater than the thickness of the sheet. The blank is then die-shaped to the turnbuckle configuration, the circular hole assuming the described elliptical shape in the process.

---

This invention relates to turnbuckles and more particularly to a turnbuckle and a method of making a turnbuckle from sheet material.

An important object of the present invention is to provide an improved turnbuckle having a hole through the wall of each threaded end thereof for lubrication purposes or to receive set screws.

Another object of the invention is to provide a turnbuckle of the character described in which the threaded end portions each have in the wall thereof a hole of elliptical shape being generally wider at the outer surface of the wall than at the inner surface thereof, for use in lubrication of the threaded turnbuckle ends or for receiving set screws.

Yet another object of the invention is to provide an improved method of forming a turnbuckle of the character described from sheet material.

These and other objects and advantages of the invention will be better understood from the following description and appended claims when taken in conjunction with the accompanying drawings in which:

FIGURE 1 is a top plan view of the turnbuckle of the present invention connected to a pair of shanks shown fragmentally in broken lines;

FIGURE 2 is an enlarged fragmentary top plan view of one cylindrical end portion of the turnbuckle of the instant invention;

FIGURE 3 is a cross-sectional view taken along line 3—3 of FIG. 2;

FIGURE 4 is a sectional view taken along line 4—4 of FIG. 3;

FIGURE 5 is a fragmentary view of the section of FIG. 3, further including the attached shank and a set screw;

FIGURE 6 is a top plan view of the turnbuckle blank stamped from a strip of sheet material shown fragmentally in broken lines;

FIGURE 7 is an enlarged fragmentary perspective view of one end of the turnbuckle blank of FIG. 6 with the final cylindrical shaped form shown in broken lines.

Referring now to the drawings, in particular FIG. 1 thereof, there is shown a pair of shanks 50 and 55 in broken lines connected by a turnbuckle generally designated 100. Turnbuckle 100 includes two substantially cylindrical ends 102 and 103 which are connected by and integral with two straps 104 and 105 to form the completed turnbuckle 100. The inner surface of each end 102 and 103 is threaded to receive externally threaded shanks 50 and 55, respectively. End 102 and shank 50 are preferably provided with left hand threads and end 103 and shank 55 are preferably provided with right hand threads. Straps 104 and 105 are connected to ends 102 and 103 by integral curved connecting portions 106 and 107. More specifically, straps 104 and 105 are connected to end 102 by connecting portions 106 and to end 103 by connecting portions 107.

The shape of turnbuckle 100 and the method of forming same is disclosed in greater detail in applicant's U.S. Patent No. 2,881,510 which issued on Apr. 14, 1959 and the disclosure of that patent is incorporated herein by reference.

Turnbuckle 100 of the present invention further includes in the wall of each of the cylindrical ends 102 and 103 an opening or hole generally designated 110 and shown in greater detail in FIGS. 2 through 4 which show one end 102 of turnbuckle 100. Referring now to FIGS. 2 through 4, it can be seen that opening 110 extends entirely through the upper wall of cylindrical end 102, the outer and inner edges 112 and 114 thereby describing generally elliptical curves on the outer and inner surfaces 115 and 116, respectively, of the wall. The circumference of the outer edge 112 is greater than the circumference of the inner edge 114 so that the opening 110 has a funnel-like, countersunk shape.

The opening or hole 110 is further characterized by the unique arrangement of the edges 112 and 114. The curves formed by edges 112 and 114 are so aligned that their centers define a line passing radially through the axis of cylindrical end 102. But the generally elliptical curves of edges 112 and 114 are so oriented that the larger diameter or major axis of inner edge 114 is substantially parallel to the smaller diameter or minor axis of outer edge 112, as is best indicated in FIG. 2, thereby defining a plane which passes radially through the axis of end 102. This causes the inward slope of wall 117 of opening 110 to be relatively gradual at those portions of opening 110 adjacent the sides of the turnbuckle as shown in FIG. 3 and relatively steep at those portions of opening 110 toward the ends of end 102 and end 103 as indicated in FIG. 4.

Openings 110 may be used for lubrication of the threaded portions of shanks 50 and 55 and ends 102 and 103 of turnbuckle 100. The funnel shape of opening 110 facilitates passage of the lubricant therethrough. Each opening 110 may also be used to receive a set screw 118 as shown in FIG. 5 for locking shanks 50 or 55 against rotation in the turnbuckle ends 102 and 103. Set screw 118 is preferably of the self-tapping variety, but the openings 110 may be separately tapped and a conventional set screw used.

Referring now to FIGS. 6 and 7 of the drawing, there is shown the preferred method of forming turnbuckle 100 from a strip of sheet material 119. The sheet material 119 is preferably a metal such as steel or brass having a thickness between 1/16 inch and 1/8 inch. A series of stamping and punching operations are first performed on the sheet to form a blank 120. These operations are more fully described in the aforementioned U.S. Patent No. 2,881,510. A single stamped turnbuckle blank 120 is shown in solid lines in FIG. 6 with surrounding connected portions of the sheet metal strip and adjacent blanks shown in broken lines. Blank 120 includes a pair of end portions 122 and 123 which are eventually formed into turnbuckle ends 102 and 103, respectively. Blank 120 is connected at end portions 122 and 123 to the remainder of the strip of sheet material 119 by connecting neck portions 124 and 126, respectively. End portions 122 and 123 are connected by and integral with a pair of strap portions 127 and 128 which are eventually formed into turnbuckle straps 104 and 105, respectively. At approximately the center of each of end portions 122 and 123, intermediate strap portions 127 and 128, is a small circular hole or opening 130 preferably having a diameter slightly larger than the thickness of the sheet material 119. Hole 130 may be punched in blank 120 during any one of the aforementioned stamping and punching operations. When blank 120 is formed into turnbuckle 100, hole 130 will assume the funnel-like shape of opening 110 described above and indicated in FIGS. 1 through 4.

Next, a series of die forming operations, more fully described in the aforementioned U.S. Patent No. 2,881,510, are performed on the blank 120. As a result of these die forming operations the end portions 122 and 123 of blank 120 are bent downward into a substantially cylindrical configuration as indicated in broken lines in FIG. 7. This downward bending of end portions 122 and 123 serves to stretch and enlarge outer edge 112 and to pinch and reduce inner edge 114 into the generally elliptical shapes indicated in FIGS. 1 and 2.

After the series of die forming operations are completed, the points connecting end portion 122 to neck portion 124 and connecting end portion 123 to neck portion 126 are severed. The inner surfaces of cylindrical ends 102 and 103 of the formed turnbuckle are then threaded to produce a finished turnbuckle.

It is significant that in the present invention, opening 130 is placed in blank 120 prior to the die forming operations. Stamping or punching the hole 130 in the preformed turnbuckle blank 120 is much simpler and more economical than drilling or otherwise forming the holes in the ends 102 and 103 of the completed turnbuckle 100. Further, the action of the die forming operations on the stamped holes 130 serves to deform them to the unique shape of the funnel-like openings 110 indicated in FIGS. 1 through 4.

It will be seen that there has been provided an improved turnbuckle with lubrication holes through the walls of each of the threaded ends and an improved method of making same, which fulfill the objects and advantages set forth above. It is to be understood that while there has been described herein the preferred embodiment of the invention, it is obvious that changes and modifications can be made in the invention without departing from the spirit and scope thereof. Accordingly, the invention is to be limited only as set forth in the following claims.

I claim:

1. A turnbuckle comprising a pair of hollow cylindrical end portions connected by and integral with a pair of strap portions, each of said cylindrical end portions having a substantially funnel-shaped opening through the wall thereof, each end of each of said openings being elongated transversely of the opposite end thereof.

2. The turnbuckle of claim 1, wherein the inner and outer edges of said opening describe a pair of substantially elliptical curves respectively, along the inner and outer surfaces of said wall, the outer one of said curves being larger than the inner one of said curves.

3. The turnbuckle of claim 2, wherein the minor axis of said outer curve and the major axis of said inner curve are parallel and define a plane which passes radially through the axis of said cylindrical end portion.

References Cited

UNITED STATES PATENTS

| 390,992 | 10/1888 | Stillman | 287—60 |
| 645,810 | 3/1900 | Hennessy | 287—60 |
| 2,696,397 | 12/1954 | Booth | 287—60 |
| 2,577,167 | 12/1951 | Vlasis | 287—60 XR |

DAVID J. WILLIAMOWSKY, Primary Examiner

ANDREW V. KUNDRAT, Assistant Examiner